United States Patent
Bäcklund

(10) Patent No.: US 6,209,401 B1
(45) Date of Patent: Apr. 3, 2001

(54) TENSION FORCE METER

(76) Inventor: Kenneth Lars Bäcklund, Åkerivägen 18, S-891 77 Järved (SE)

( * ) Notice: Subject to any disclaimer, the term of this patent is extended or adjusted under 35 U.S.C. 154(b) by 0 days.

(21) Appl. No.: 09/125,663

(22) PCT Filed: Feb. 18, 1997

(86) PCT No.: PCT/SE97/00271
§ 371 Date: Aug. 19, 1998
§ 102(e) Date: Aug. 19, 1998

(87) PCT Pub. No.: WO97/31250
PCT Pub. Date: Aug. 28, 1997

(30) Foreign Application Priority Data

Feb. 18, 1997 (SE) ................................. PCT/SE97/00271
Feb. 20, 1997 (SE) ................................. PCT/SE96/00636

(51) Int. Cl.[7] ....................................................... G01N 3/08
(52) U.S. Cl. .......................................... 73/829; 73/862.42
(58) Field of Search ........................ 73/862.391, 862.42, 73/862.451, 862.46, 862.471, 862.472, 862.473, 829

(56) References Cited

U.S. PATENT DOCUMENTS

| 2,307,090 | * | 1/1943 | Pilliod et al. | 73/862.41 |
| 2,592,868 | * | 4/1952 | Cushman | 73/862.471 |
| 3,359,790 | * | 12/1967 | Dillon | 73/862.42 |
| 3,868,662 | * | 2/1975 | Russell, Jr. | 73/862.471 |
| 3,879,999 | * | 4/1975 | Saxl | 73/862.471 |
| 4,118,978 | * | 10/1978 | Lowenheck | 73/862.472 |

* cited by examiner

*Primary Examiner*—Max Noori
(74) *Attorney, Agent, or Firm*—John Lezdey & Assoc

(57) ABSTRACT

Device for measuring tension force in web and wire without giving any permanent affect on the measured object. In goods transportation it is common to use webs to tie down the load to the load carrier, and it is important that the right pretension force is applied to achieve a safe transport. The device enables this force to be checked before and even during the transport. The device is a hand carried device that can be moved across the measured object from the side, perform the measurement after an activation arm has been pulled, and be removed after deactivation without having any remaining affect on the lashing. Technically, this is done when the activation forces the object to bend over a number of rolls. This bending calls for a force perpendicularly to the measured object that is registered, recalculated and displayed as the searched force in the object. To achieve high accuracy, the instrument is equipped with two widthsetters which setting allows exact positioning sidewise of the measured object and a device that can be adjusted and compensates the force for the free length of the object. In addition, the instrument has an automatic power+ control which alarms when the battery must be changed.

12 Claims, 2 Drawing Sheets

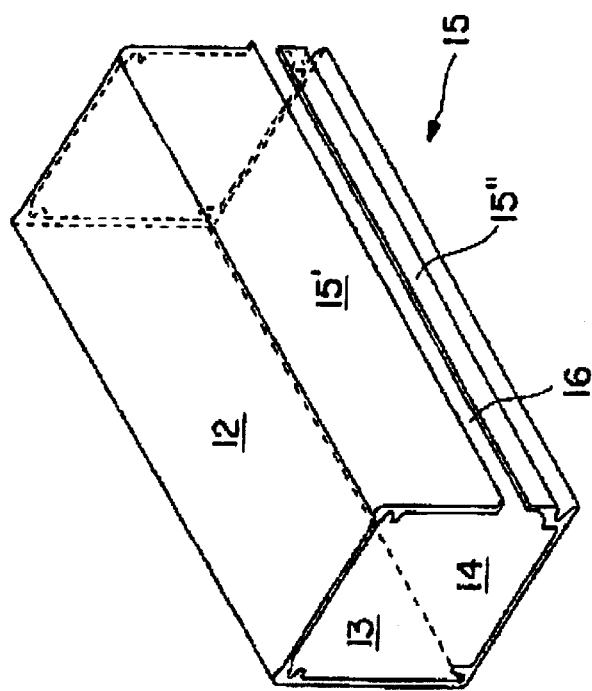
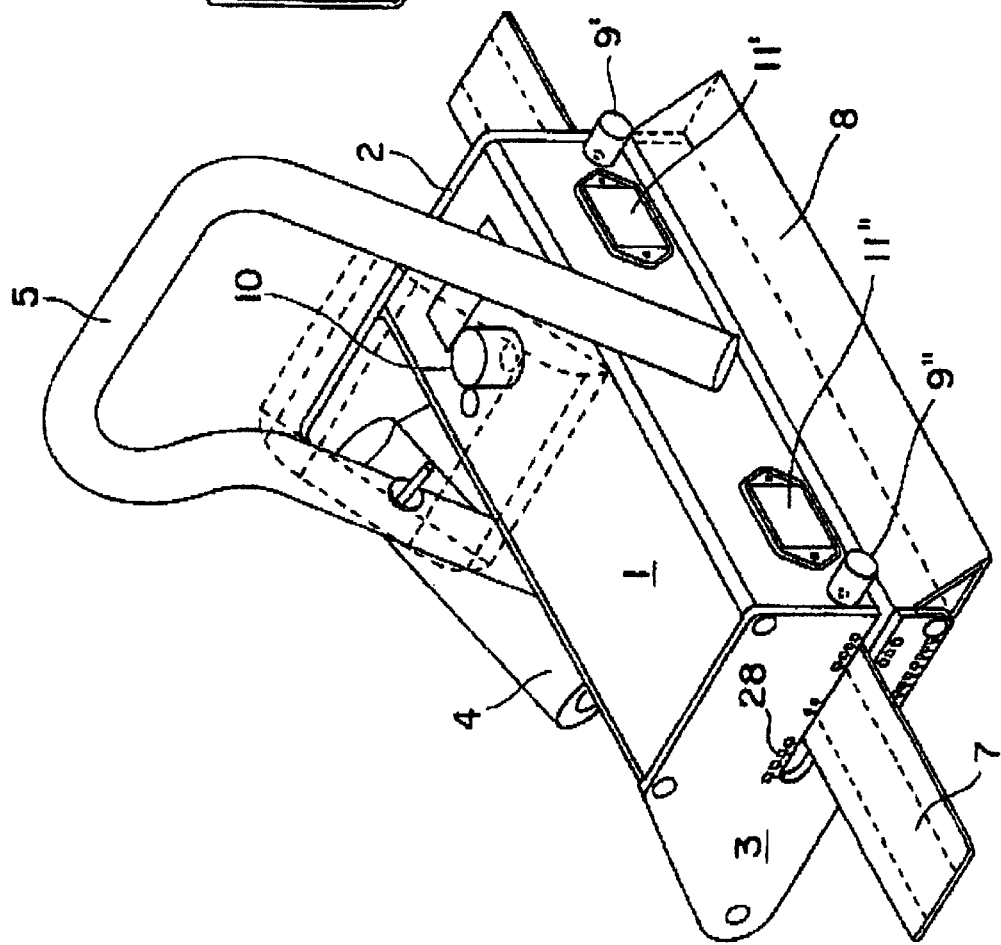

TENSION FORCE METER

FIELD OF THE INVENTION

The following invention describes a device to measure tension force in pretensioned web and pretensioned wire without having any remaining affect on the measured object.

The device that is primarily expected to be used in the transport sector is a portable easy handled control instrument for authorities, transporters and senders.

BACKGROUND OF THE INVENTION

The background of the invention is the need in the transport sector for the possibility to easily and quickly check tension force in lashing bands to secure desired pretension forces in order to increase traffic safety and decrease transport damages.

DESCRIPTION OF THE PRIOR ART

The ability to control the so called pretension force in webs and wires is of primary importance in transport to achieve safe securing of cargo to carrier. This control should also be possible to be carried out in such a way that it doesn't permanently affect the lashing.

Today there are no such equipment that meets the above demand.

Measuring tension force in wire or similar objects by bending it over three points and measuring the force across the object for actual bending (approx. a linear function of the tension force), recalculating it to tension force (alt. calibrate it against actual force) and presenting it as the wanted force is a well known technique. This was described already in 1929 in the patent U.S. Pat. No. 1,722,036 and later in among others U.S. Pat. No. 1,871,776, UYS 3,653,258, U.S. Pat. No. 3,698,244 and U.S. Pat. No. 4,860,597 and now latest in U.S. Pat. No. 4,860,597 and FR 2 711 425.

The known technique, that mostly has been used for wires, has had its main use for lifting devices (cranes, traverses, etc.) where it has been used as a so called overload protection.

Because of that, the existing equipment is designed for wire and mainly planned to be used in fixed installations.

The known technique is not used in the transport sector, as well as on the type of lashing bands that are so common. For that reason no portable easy handled instrument has been developed for measuring tension force in webs and wires.

SUMMARY OF THE INVENTION

The purpose of the invention is to supply a device that makes it easy to check the force momentarily in a lashing from the time it is tightened until it is untightened.

Consequently, the tension force meter weights only approx. 3 kg and has the dimension approx. 20×10×30 cm. To achieve bending of the measured object the device utilizes rolls and axles. Beside that there is a measure unit (mechanical or electronic) that registrates the needed force to produce actual bending and by recalculation/calibration displays the searched tension force.

A significant advantage with a device according to the invention is that it easily can be moved across the object, perform the measuring and as easily be removed without having any remaining affect on the lashing. This calls for geometries to be chosen so that the measured object is permanently in its elastic state.

BRIEF DESCRIPTION OF THE DRAWING

FIG. 1 shows a chosen design for the described device together with a piece of the measured object (in this case a web).

FIG. 2 shows the chassis.

FIG. 1 shows a preferable chosen technical solution that corresponds to the invention. It shows among other things the chassis 1 that works both as "holder" of important geometric points for the device as well as force collector and protector shell for the more important parts in the invention. To the chassis (10 is screwed the front gable 2 and rear gable 3 which completes the instrument case. The gables (2,3) have longitudinal grooves that give room for the measured object. Pos. 4 shows the handle by which the instrument is maneuvered. No. 5 is the activating lever that when pulled to a vertical position rotates in the measure unit 6 (FIG. 3) towards the measured object 7 and bends it. The guiding list 8 minimizes the introduction of the measure object into the instrument. The knobs for front and rear widthsetters is shown by 9' and 9". Also the knob for the lengthsetter 10 and the both battery boxes 11' and 11" can be seen.

FIG. 2 shows the chassis (1) with it's four sides 12 (upper side), 13 (handle side), 14 (bottom) and front side 15. The front side is by a longitudinal opening 16 along its full length divided in an upper part 15' and a lower part 15".

FIG. 3 shows the mechanical parts inside the chassis and a measured object (7). The measure unit (6), that through a rotational movement bends the measured object (7) between the support rolls 17 and 18, consist of among other things a roll 19 mounted in bearings, a measure wagon 20, a load cell 21 and a carrier axle (22) which is carried in bearings in the chassis (1). 23 and 24 are widthsetters with the stopplates 25, 26 that act as stops for the measured object and which correct set centers the object (7) sidewise under the measure unit (6).

FIG. 4 shows the electronic unit 27 which is protectedly placed inside the chassis. The tension force meter is additionally equipped with a switch (not shown in figure) for power supply. This can be arranged in such a way that it is controlled by the activating lever (5). When the activating lever is in rest position (down) all power is shut off but opens automatically when the lever is pulled.

Figure 4:
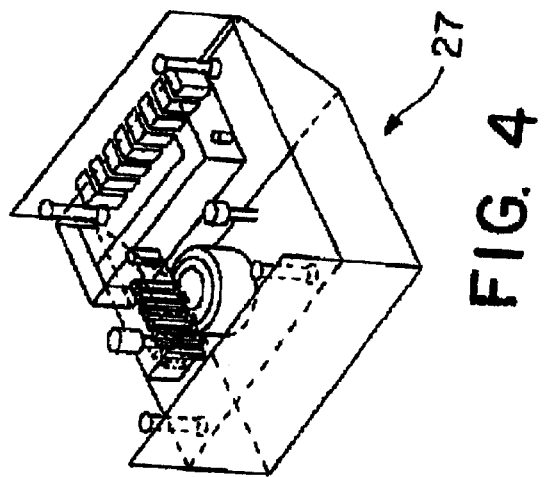
FIG. 4 shows measure electronics.
Figure 3:
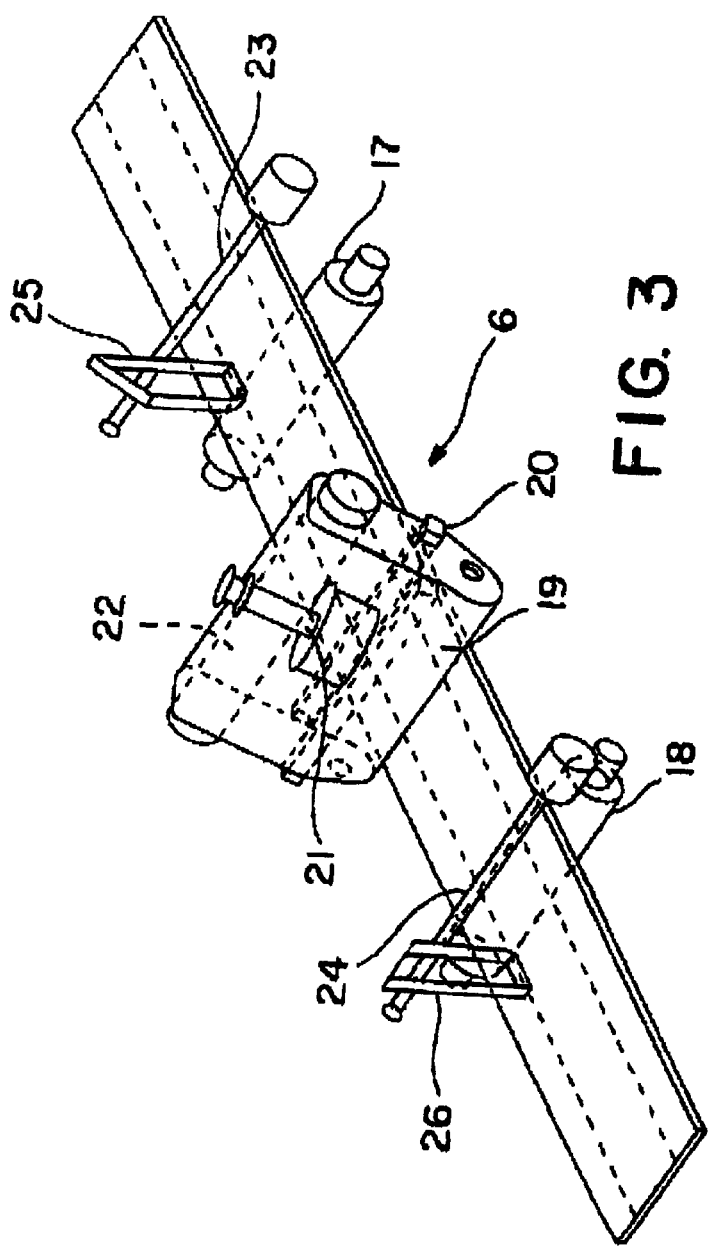
FIG. 3 shows the most important parts of the mechanical measuring device.

Above is described a technical solution where the measure unit (6) bends the measured object (7) by being rotated into the object. This movement can be replaced by a translation vertical towards the measured object.

The technique is useable on all webtypes and wires as long as the geometry is chosen so it is possible to neglect bending stiffness for the measured object. That means the stiffer the web/wire is the larger geometries (distances, rollradius, etc.) must be chosen.

Important for the measure accuracy is also that no friction force is lost in support rolls or measure roll why in these contact there should only exist normal forces towards axle centers. Because of that these components preferable should be mounted in bearings. Of the same reason the widthsetters are important. Correct set friction forces are minimized in the measure unit at the same time as mislined forces are avoided.

Preferably measure geometry for normal lashing bands with recommended pretension force 5 kN is for example 200 m between the support rolls and 5–20 mm bending perpendicular to the web. The diameters for the measure roll and the support rolls can at the same time be approx. 20 mm.

What is claimed is:

1. A device for momentary measuring of tension force in a load carrying measured object, consisting of a web, wire or band comprising a chassis whereby the measured object is movable into the device, said device further comprising a measure unit and support rolls over which the measured object is bent, said chassis comprising four longitudinal sides and an opening wherein one of said sides is a cut off side that is cut off along its full length by said opening, said opening further dividing said cut off side in an upper part and a lower part, said rollers being positioned in one of said parts and the measuring unit in the other part.

2. The device according to claim 1 wherein said lower part of said cut off side supports one end of said support rolls.

3. The device according to claim 1 further comprising widthsetters wherein said upper part of the cut off side holds said measure unit and said widthsetters.

4. The device according to claim 1 wherein said measure unit includes a roll and a measure wagon, said roll being mounted in bearings in said measure wagon, said measure unit further comprising a device for force measuring and a carrier axle.

5. The device according to claim 1 further comprised of front and rear widthsetters, said front and rear widthsetters comprised of gables and sidewise adjustable stopplates, said stopplates center said measured object under said measure unit wherein said gables are equipped with said centering measurescale that assists the centering of said stopplates.

6. The device according to claim 1 further comprising a knob and measuring electronics wherein said knob effects said electronics and compensates for the object's free length.

7. The device according to claim 1 further comprising an angle profile wherein the lower part of the cut off side contains an angle profile assembled along its full length which assists moving the measured object into the device.

8. The device according to claim 6 further comprising batteries wherein said measuring electronics and batteries are totally covered and protected by said chassis.

9. The device according to claim 1 further comprising an activating arm wherein when said arm is turned to a rest position all power is shut off to automatically be turned on when measuring.

10. The device according to claim 5 further comprising a front and rear gable, said gable having long grooves, which give room for the measured object when it is moved and which make the device stiffer.

11. The device according to claim 6 wherein said measuring electronics compensate the measurevalue for different temperatures of the measured object.

12. The device of claim 1 wherein said measured object is selected from a group consisting essentially of web and wire.

* * * * *